US012135222B2

(12) United States Patent
Ferroni (10) Patent No.: US 12,135,222 B2
(45) Date of Patent: Nov. 5, 2024

(54) AUTOMATIC GENERATION OF VECTOR MAP FOR VEHICLE NAVIGATION (71) Applicant: Argo AI, LLC, Pittsburgh, PA (US)

(72) Inventor: Francesco Ferroni, Bayern (DE)

(73) Assignee: Argo AI, LLC, Pittsburgh, PA (US)

( * ) Notice: Subject to any disclaimer, the term of this patent is extended or adjusted under 35 U.S.C. 154(b) by 272 days.

(21) Appl. No.: 17/323,061

(22) Filed: May 18, 2021

(65) Prior Publication Data

US 2022/0373354 A1   Nov. 24, 2022

(51) Int. Cl.
*G01C 21/00* (2006.01)
*B60W 60/00* (2020.01)
*G01C 21/34* (2006.01)
*G06F 18/21* (2023.01)
*G06F 18/24* (2023.01)
*G06K 9/00* (2022.01)
*G06K 9/62* (2022.01)
*G06N 3/04* (2023.01)
*G06N 3/08* (2023.01)
*G06V 10/40* (2022.01)
*G06V 20/56* (2022.01)

(52) U.S. Cl.
CPC ....... *G01C 21/3815* (2020.08); *B60W 60/001* (2020.02); *G01C 21/3407* (2013.01); *G06F 18/21* (2023.01); *G06F 18/24* (2023.01); *G06N 3/04* (2013.01); *G06N 3/08* (2013.01); *G06V 10/40* (2022.01); *G06V 20/588* (2022.01); *B60W 2552/53* (2020.02)

(58) Field of Classification Search
CPC .......... G01C 21/3815; G01C 21/3407; B60W 60/001; B60W 2552/53; B60W 2556/40; G06V 10/40; G06V 20/588; G06V 10/82; G06F 18/24; G06F 18/21; G06N 3/04; G06N 3/08; G06N 3/042; G06N 3/0464
See application file for complete search history.

(56) References Cited

U.S. PATENT DOCUMENTS 9,547,805 B1    1/2017  Erignac
10,373,002 B2   8/2019  Kwant et al.
2017/0259801 A1 9/2017  Abou-Nasr et al.
(Continued)

FOREIGN PATENT DOCUMENTS

CN   102270343 A   * 12/2011
CN   111874006 A   * 11/2020 .......... B60W 60/001

OTHER PUBLICATIONS

Machine Translation of CN102270343A (see at least [0029]) (Year: 2011).*

(Continued)

*Primary Examiner* — Sahar Motazedi
(74) *Attorney, Agent, or Firm* — Fox Rothschild LLP (57) ABSTRACT

A system will generate a vector map of a geographic area using a method that includes receiving a birds-eye view image of a geographic area. The birds-eye view image comprises various pixels. The system will process the birds-eye view image to generate a spatial graph representation of the geographic area, and it will save the node pixels and the lines to a vector map data set. The processor may be a component of a vehicle such as an autonomous vehicle. If so, the system may use the vector map data set to generate a trajectory for the vehicle as the vehicle moves in the geographic area.

12 Claims, 6 Drawing Sheets (56) References Cited

U.S. PATENT DOCUMENTS

| | | | |
|---|---|---|---|
| 2018/0189578 A1* | 7/2018 | Yang | G06T 17/00 |
| 2019/0130182 A1 | 5/2019 | Zang et al. | |
| 2019/0163991 A1 | 5/2019 | Tian et al. | |
| 2019/0266418 A1 | 8/2019 | Xu et al. | |
| 2020/0026960 A1* | 1/2020 | Park | G06V 10/776 |
| 2020/0041284 A1 | 2/2020 | Liu et al. | |
| 2020/0200548 A1 | 6/2020 | Chawla | |
| 2020/0273219 A1 | 8/2020 | Jiang et al. | |
| 2020/0327338 A1* | 10/2020 | Philion | G05D 1/0238 |
| 2020/0386567 A1 | 12/2020 | Igarashi | |
| 2021/0342585 A1 | 11/2021 | Fleisig et al. | |
| 2022/0155097 A1 | 5/2022 | Tsukamoto | |

OTHER PUBLICATIONS

Machine Translation of CN111874006A (Year: 2020).*
"Chu. H, et. al., 'Neural Turtle Graphics for Modeling City Road Layouts', pp. 1-7" (Year: 2019).*
"Wei. Y, et. al., 'Simultaneous Road Surface and Centerline Extraction From . . . Remote Sensing Images . . . ', pp. 3-11" (Year: 2020).*
"Li. X, et. al., 'Topology-Enhanced Urban Road Extraction . . . ', pp. 1-9" (Year: 2020).*
Denel, T. et al., "Spatial Graph Convolutional Networks," arXiv:1909.05310v2 [cs.LG], Jul. 2, 2020.
PCT/ISA/220 Transmittal of International Search Report for PCT/US2022/071795, dated Jun. 28, 2022.
PCT/ISA/210 International Search Report for PCT/US2022/071795, dated Jun. 28, 2022.

* cited by examiner

AUTOMATIC GENERATION OF VECTOR MAP FOR VEHICLE NAVIGATION

BACKGROUND

Modern vehicles, and especially autonomous vehicles (AVs), rely on high definition (HD) vector maps to enable their on-board processing systems to make navigation decisions. A vector map is a set of digital files containing data about physical details of a geographic area such as roads, lanes within roads, traffic signals and signs, barriers, and road surface markings. Vector maps include various details that may appear, or which may be hidden, depending on the level of resolution selected at the time that the map is accessed. An AV uses vector map data to augment the information that the AV's on-board cameras, light detection and ranging (LiDAR) system and/or other sensors perceive. The AV's on-board processing systems can quickly search map data to identify features of the AV's environment and/or to help verify information that the AV's sensors perceive.

However, vector maps are not yet available for all possible locations in which an AV may navigate. In addition, over time, vector maps can become outdated. Map changes can occur or new maps may be required due to new road construction, road maintenance, construction projects that cause temporary lane changes and/or detours, or other reasons.

Current methods of generating vector maps rely on multiple networks and a significant amount of pre-processing or post-processing of data to transfer data between networks. They also require a significant amount of manual input. This means that the map generation process is computationally intensive, manual labor intensive, or both.

This document describes methods and systems that are directed to addressing the problems described above, and/or other issues.

SUMMARY

In various embodiments, a system for generating a vector map of a geographic area includes a processor and a memory device containing programming instructions. The instructions are configured to cause the processor to perform a method that receives a birds-eye view image of a geographic area. The birds-eye view image comprises various pixels. The system will process the birds-eye view image to generate a spatial graph representation of the geographic area, The spatial graph representation comprises nodes and lines. The system will save the nodes and the lines to a vector map data set. The processor may be a component of a vehicle such as an autonomous vehicle. If so, the system may use the vector map data set to generate a trajectory for the vehicle as the vehicle moves in the geographic area.

Optionally, when processing the image to generate the spatial graph representation of the geographic area, the system may process the birds-eye view image to classify each pixel of the birds-eye view image as either a lane pixel or a non-lane pixel. The system may then process the lane pixels to extract features of the geographic area that are to be represented in the map. A lane border is an example of such a feature. Optionally, the system may employ a neural network to perform the processing of the lane pixels to extract the features.

For each of the lane pixels, the system will determine a likelihood value that the lane pixel contains a feature of the geographic area that is be represented in the map. The system will then classify the lane pixels having likelihood values that exceed a threshold as node pixels. The system will then generate the lines such that each line connects a pair of the node pixels, wherein each of the lines represents a lane segment in the geographic area. The system will then save the node pixels and the lines to the vector map data set.

Optionally, before generating the lines that connect the pairs of node pixels, the system may transform each of the node pixels into a one-dimensional token. Each one-dimensional token may be a vector representing one or more characteristics that are present at the geographic area at a spatial location that corresponds to the node pixel.

In addition or alternatively, when generating the lines that connect the pairs of node pixels, the system may generate a connectivity matrix by: (i) identifying as the pairs of node pixels any pair of adjacent node pixels having features that indicate a relationship of spatial similarity; and (ii) generating a matrix in which each element of a the matrix has a value that indicates whether the pair of adjacent node pixels that the element represents are connected.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." Definitions for additional terms that are relevant to this document are included at the end of this Detailed Description.

A high definition (HD) vector map represents observable, physical objects in parametric representations. The objects contained in a vector map are those features of a drivable area that define the drivable area and provide information that a vehicle can use to make decisions about how to move about the drivable area. Unlike raster maps which arrange data in the form of a grid of pixels, vector maps arrange data in the form of vertices and paths. The three basic symbol types of vector data are points (which are x, y coordinates, also known as nodes or vertices), lines (paths between nodes, also known as edges) and polygons (which are groups of points and lines that connect nodes and form a closed path).

Figure 1:
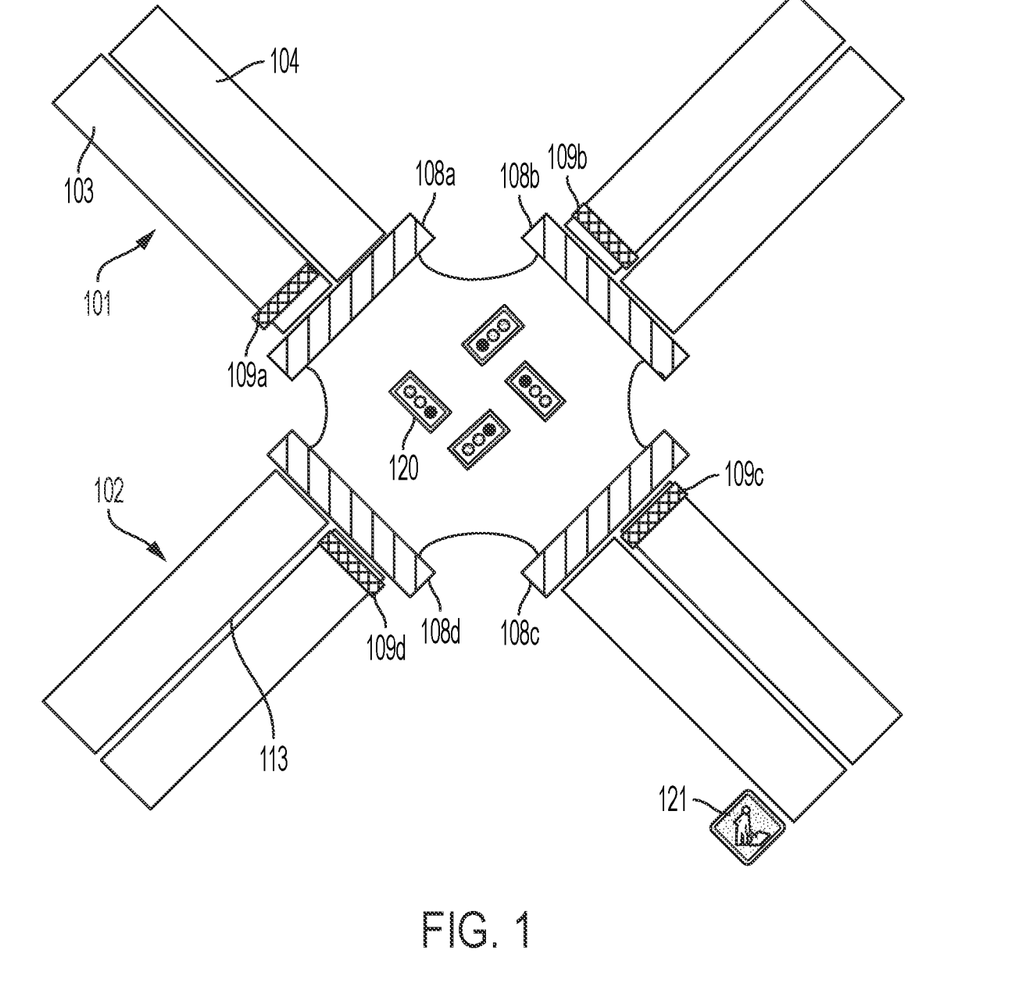
FIG. 1 illustrates an example of vector map data for a geographic area.

FIG. 1 illustrates an example illustration of vector map data for an intersection in which a first road 101 intersects with a second road 102. In FIG. 1, cross hatching and other detail is added to help illustrate the different features for the purpose of this discussion, but in reality the vector map will simply include the lines, nodes and polygons. The geometry of each lane within each street may be represented as polygons such as lane polygons 103 and 104. Crosswalks 108a-108d and other road markings such as double centerlines 113 may be represented as polylines or pairs of parallel polylines, while stop lines such as 109a-109b may be represented as polygons. Traffic lights 120 and traffic control signs 121 also may be represented as polygons. Some traffic control structures, such as road barriers or bollards (i.e., posts that divert traffic from a particular lane or area) may be represented as holes or other shapes in the map. The HD map will store this data, along with tags that label the data identifying the type of feature that the geometry represents, such as road construction sign, crosswalk, lane, etc.

Figure 2:
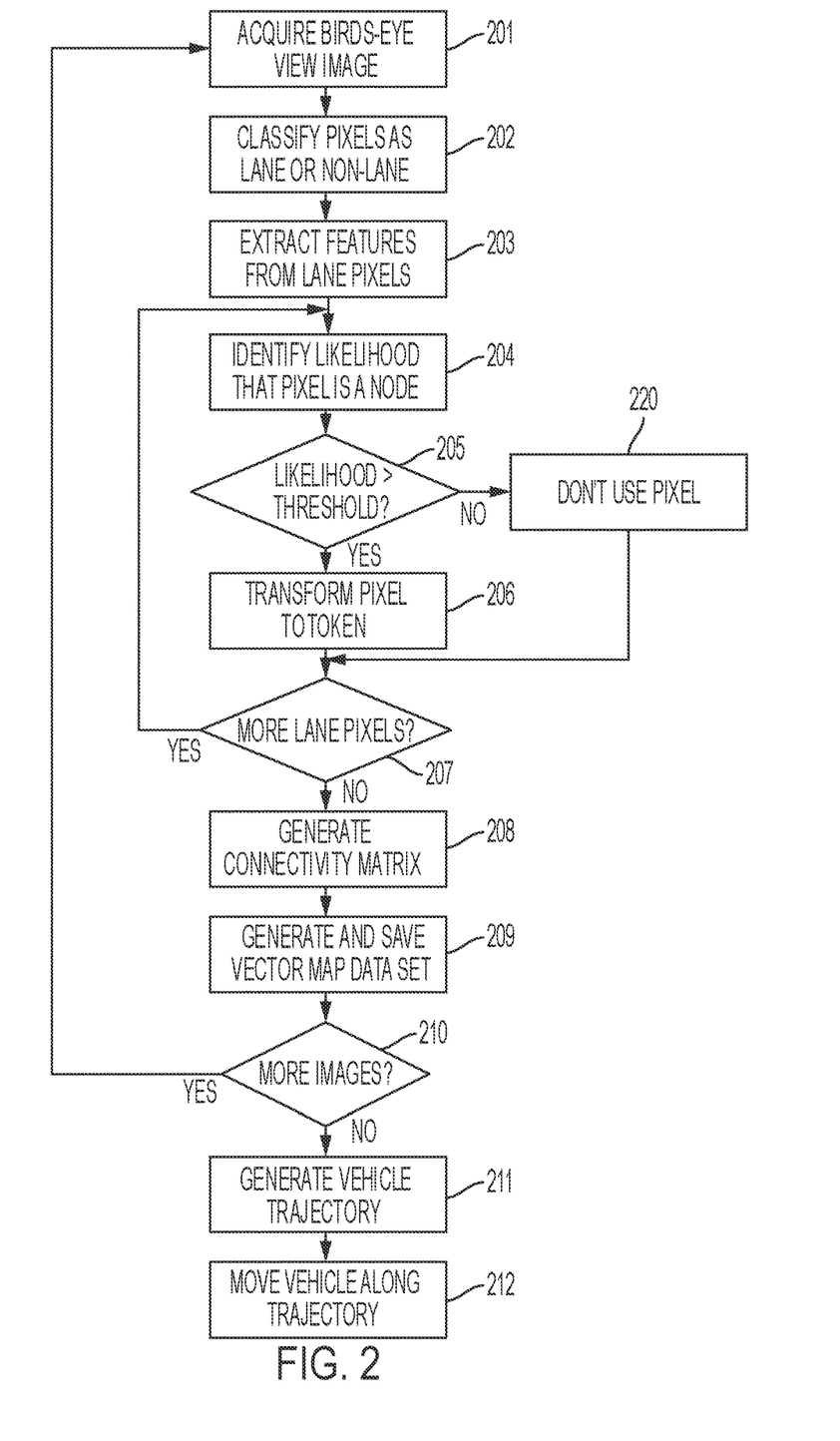
FIG. 2 illustrates an example process for generating vector map data for a geographic area from birds-eye view images of the area.

FIG. 2 is a flow diagram illustrating a process by which a computing system may process an image of a geographic area to automatically generate an HD map of the geographic area. The computing system may be a stand-alone system that receives images captured of the area to generate HD maps for use by autonomous vehicles, or the computing system may be an on-board component of one of more of the vehicles themselves.

Figure 3A:
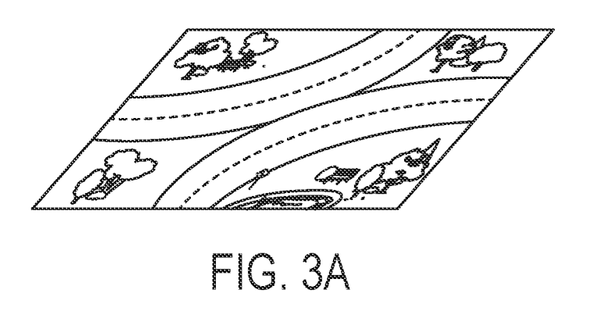
FIGS. 3A through 3C illustrate data transformations that may occur in the process of FIG. 2.

The system starts at 201 by acquiring a birds-eye view image of a geographic area. The birds-eye view image is a digital image that includes pixels, such as in a raster image. However, the image need not necessarily be a raster image, and it could for example include black-and-white pixels. The birds-eye view may be obtained from a data set such as from publicly available or commercially available geographic information systems data, or the system may receive data from a transmission via a communication link from a camera carried by an airborne device such as a satellite, an aircraft or a drone. FIG. 3A illustrates an example birds-eye view image that depicts two 2-lane roads in a geographic area.

The system will process the birds-eye view image to generate a spatial graph representation of the geographic area. A graph representation G is a data structure that includes vertices V (also called nodes) and edges E (also called lines), and thus may be represented as G=(V, E). Given N number of vertices in the graph, the complete connectivity can be represented by an adjacency matrix of size N×N, where up to M=2N edges exist. Given D features per node, an N×D feature matrix can represent attributes of individual nodes. Given P features per edge, an M×P feature matrix can represent attributes of individual edges. This system therefore implements a function F that, given a birds-eye view image I, predicts a graph G with vertices V and attributes D, and edges M with attributes P:

$$G(V, E)=F(I), \text{ where } V \in R^D \text{ and } E \in R^P$$

Figure 3B:
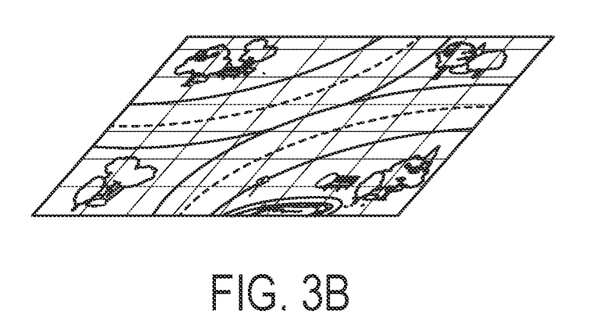

The system will generate the spatial graph representation of the geographic area using some or all of the steps shown in FIG. 2. For example, at 202 the system may process the birds-eye view image to classify each pixel of the birds-eye view image as either a lane pixel or a non-lane pixel. The system may do this using any suitable image classifier, such as one that looks for white lines or yellow lines in the pixels, as such lines typically correspond to lane boundaries. At 203 the system will process the lane pixels to extract features of the geographic area that are to be represented in the map. Features may include lane boundaries as detected in step 202, and they also may include features such as traffic control measures (signals, signs and the like), crosswalks, intersections and other features. Features also may include items that are processed from the image such as a drivable area mask, a ground elevation map, RGB values of ground imagery, intensity and/or reflectivity from a LiDAR map, or a semantic LiDAR map that is created by post-processing log images and transferring semantics to LiDAR sweeps. An example processed image with lane features identified is shown in FIG. 3B. Steps 202 and/or 203 may be performed by any suitable image classification model, such that the image classification model known as ResNet, which is a trained deep learning model that uses a convolutional neural network (CNN) to classified images. The model will be pre-trained on features that are to be represented in the map data. Other types of neural networks may be used in various embodiments.

At 204 the system will determine, for each of the lane pixels, a likelihood value that the pixel contains a feature of the geographic area that is be represented in the map. The model that performs the feature extraction may return the likelihood, which also may be considered to be a confidence score. At 205 the system may then classify the lane pixels having likelihood values that exceed a threshold as node pixels. The threshold may be any suitable value, such as 50%, and the threshold may vary depending on the number of pixels that need to be processed. In addition, as used in this document the concept of "exceeding a threshold" may include actually exceeding the threshold, or having a value that is at least equal to the threshold. Pixels that do have likelihoods that exceed the threshold may be used in generation of the vector map. Pixels that do not have likelihoods that exceed the threshold will not be used in further processing steps (see 220).

Figure 4:
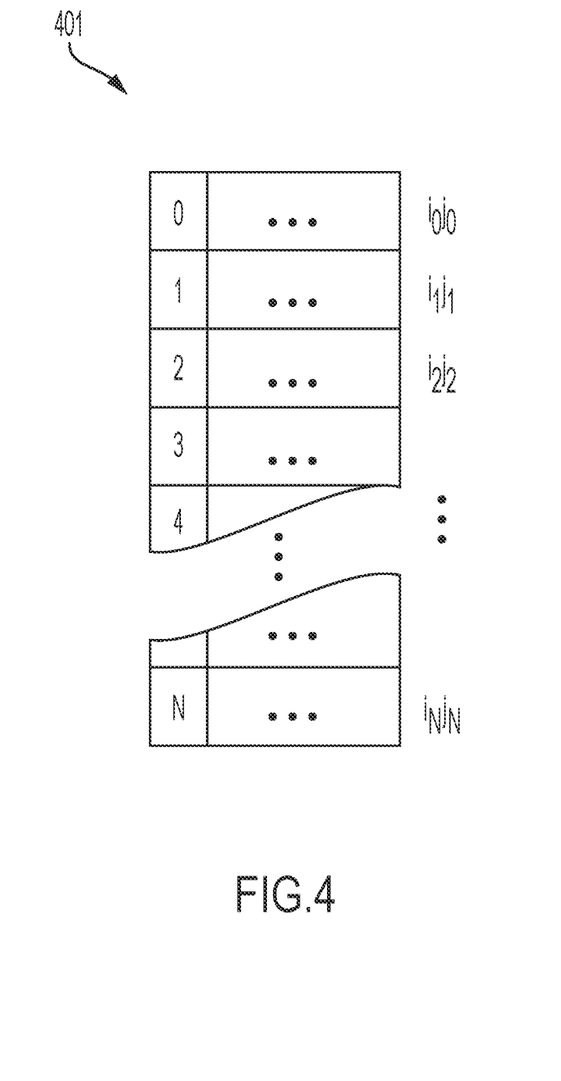
FIG. 4 illustrates an example data structure for a token representing features that are represented by a node in vector map data.

At 206 the system may transform each lane pixel that survives step 205 into a one-dimensional token. Each one-dimensional token is a vector representing one or more characteristics that are present at the geographic area at a spatial location that corresponds to the node. An example data structure for a token is illustrated in FIG. 4, in which a token 401 for a node has N features, each of which is associated with coordinates (i, j) representing the spatial location of the feature in the image. Each token also may have some or all of the data extracted by the feature extractor as described above. Each token will be associated with a node in the resulting vector map data set. The transformation may be performed using a gather operation, or by some other algorithm.

Figure 3C:
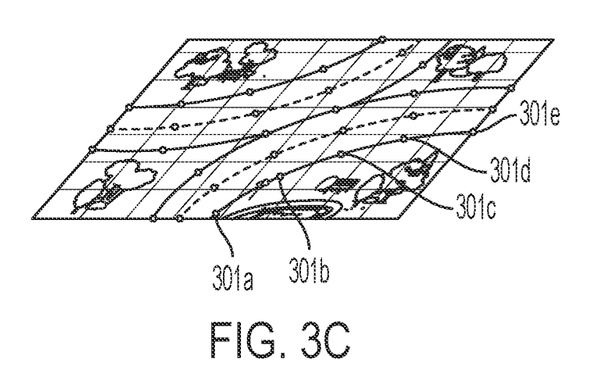

The process of steps 204-206 will repeat at 207 until all lane pixels have been processed. At any point in the process or after all lane pixels have been processed, at 209 the system may generate the vector map with lines that connect pairs of the nodes, wherein each of the lines represents a lane segment in the geographic area, and the system will save the vector map to a data set. This is shown in FIG. 3C, in which the vector map includes nodes such as nodes 301a-301e, and lines connecting the adjacent pairs of nodes represent lane borders. This generation may be done by a spatial graph convolutional network (SGCN), such as those described in Danel et al., "Spatial Graph Convolutional Networks" (2020).

Generation of the vector map also may include generation of a connectivity matrix at 208. To do this, the system may identify as the pairs of nodes any pair of adjacent nodes having features that indicate a relationship of spatial similarity. The system may then generate a matrix in which each element of the matrix has a value that indicates whether the pair of adjacent nodes that the element represents are connected. For example, in the matrix below, node pairs [A, X] and [B, Y] each consist of adjacent nodes, as indicated by the value "1" instead of "0" in their corresponding matrix cell:

| NODE | A | B | C |
|------|---|---|---|
| X    | 1 | 0 | 0 |
| Y    | 0 | 1 | 0 |
| X    | 0 | 0 | 0 |

At 210 the system may continue to process additional birds-eye view images to update the vector map with updated data, and/or to expand the boundaries of the geographic area that are covered by the vector map.

At 211 an autonomous vehicle may use the vector map data set to generate a trajectory for the vehicle as the vehicle moves in the geographic area. At 212 the vehicle's motion control system may cause the vehicle to move along the trajectory.

Figure 5:
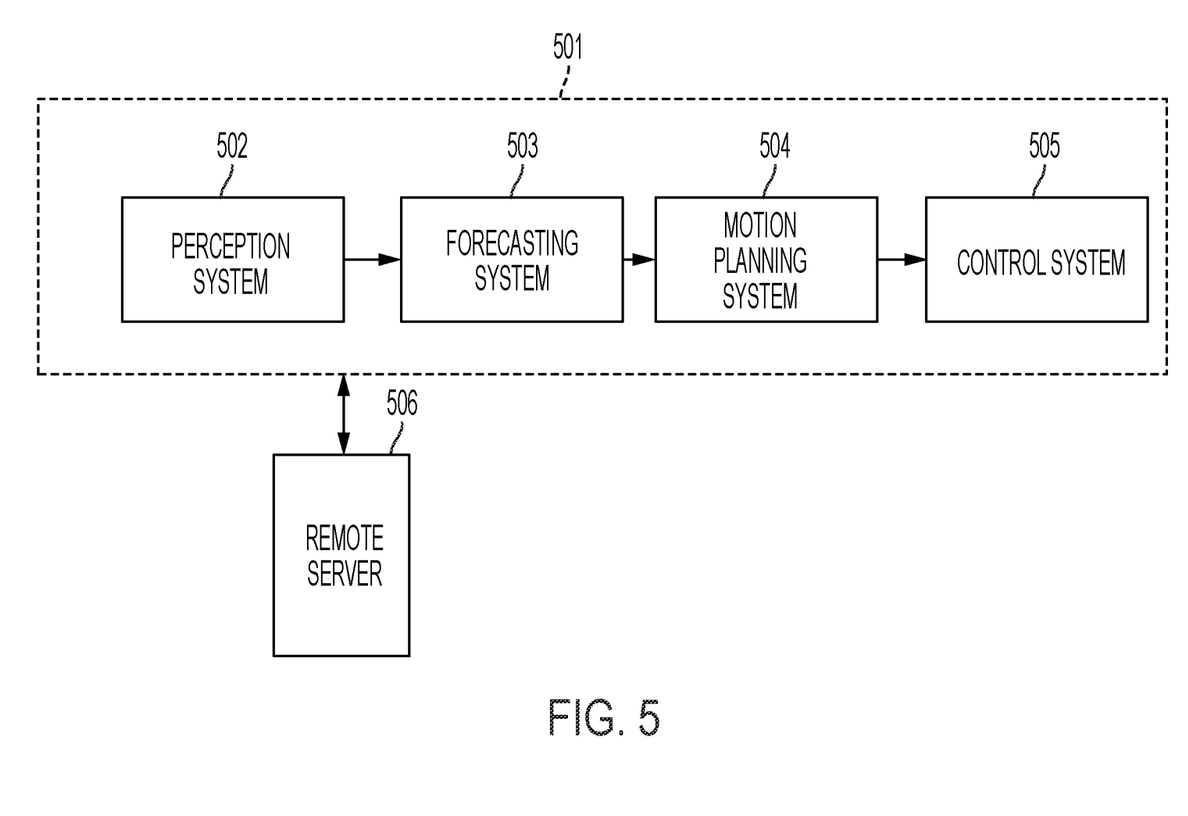
FIG. 5 is a block diagram illustrating various subsystems of an autonomous vehicle.

FIG. 5 shows a high-level overview of AV subsystems that may be relevant to the discussion above. Certain components of the subsystems may be embodied in processor hardware and computer-readable programming instructions that are part of the AV's on-board computing system 501. The subsystems may include a perception system 502 that includes sensors that capture information about moving actors and other objects that exist in the vehicle's immediate surroundings. Example sensors include cameras, LiDAR sensors and radar sensors. The data captured by such sensors (such as digital image, LiDAR point cloud data, or radar data) is known as perception data.

The perception system may include one or more processors, and computer-readable memory with programming instructions and/or trained artificial intelligence models that, during a run of the AV, will process the perception data to identify objects and assign categorical labels and unique identifiers to each object detected in a scene. Categorical labels may include categories such as vehicle, bicyclist, pedestrian, building, and the like. Methods of identifying objects and assigning categorical labels to objects are well known in the art, and any suitable classification process may be used, such as those that make bounding box predictions for detected objects in a scene and use convolutional neural networks or other computer vision models. Some such processes are described in Yurtsever et al., "A Survey of Autonomous Driving: Common Practices and Emerging Technologies" (arXiv Apr. 2, 2020).

The vehicle's perception system 502 may deliver perception data to the vehicle's forecasting system 503. The forecasting system (which also may be referred to as a prediction system) will include processors and computer-readable programming instructions that are configured to process data received from the perception system and forecast actions of other actors that the perception system detects.

The vehicle's perception system, as well as the vehicle's forecasting system, will deliver data and information to the vehicle's motion planning system 504 and control system 505 so that the receiving systems may assess such data and initiate any number of reactive motions to such data. The motion planning system 504 and control system 505 include and/or share one or more processors and computer-readable programming instructions that are configured to process data received from the other systems, determine a trajectory for the vehicle, and output commands to vehicle hardware to move the vehicle according to the determined trajectory. Example actions that such commands may cause include causing the vehicle's brake control system to actuate, causing the vehicle's acceleration control subsystem to increase speed of the vehicle, or causing the vehicle's steering control subsystem to turn the vehicle. Various motion planning techniques are well known, for example as described in Gonzalez et al., "A Review of Motion Planning Techniques for Automated Vehicles," published in *IEEE Transactions on Intelligent Transportation Systems*, vol. 17, no. 4 (April 2016).

During deployment of the AV, the AV receives perception data from one or more sensors of the AV's perception system. The perception data may include data representative of one or more objects in the environment. The perception system will process the data to identify objects and assign categorical labels and unique identifiers to each object detected in a scene.

Figure 6:
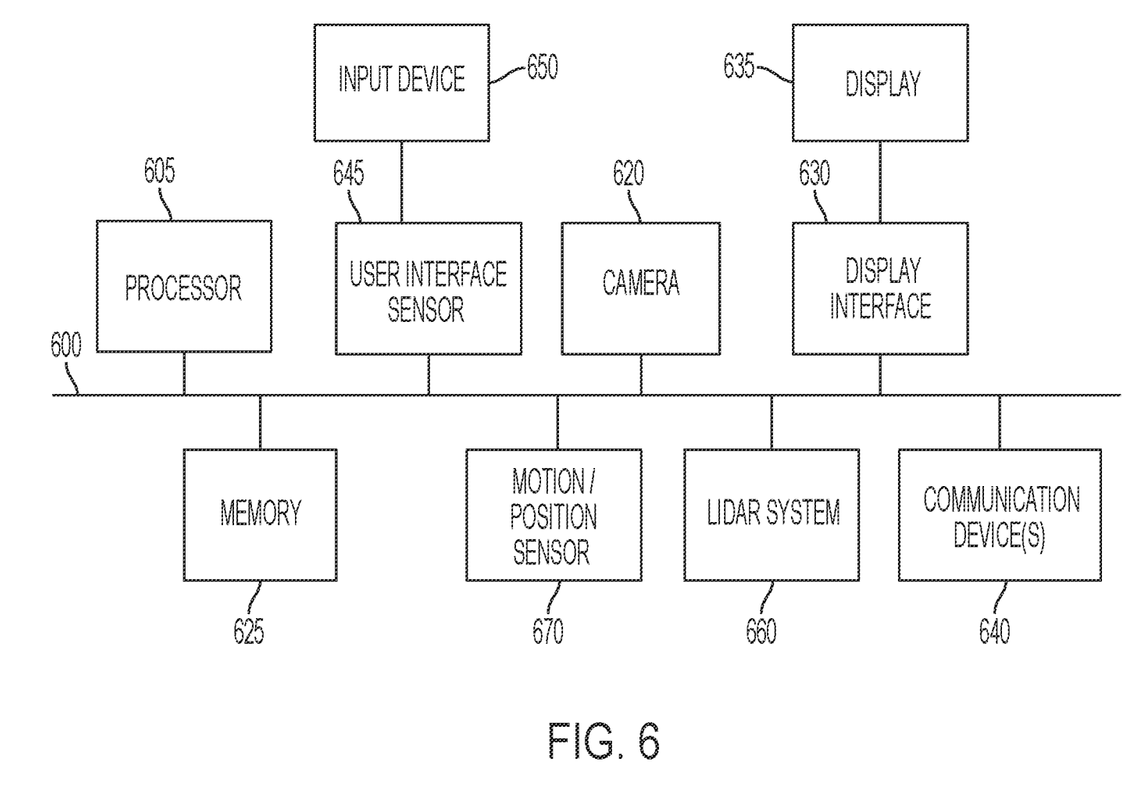
FIG. 6 is a block diagram that illustrates various elements of a possible electronic subsystem of vehicle and/or external electronic device.

FIG. 6 depicts an example of internal hardware that may be included in any of the electronic components of the system, such as internal processing systems of the AV, external monitoring and reporting systems, or remote servers. An electrical bus 600 serves as an information highway interconnecting the other illustrated components of the hardware. Processor 605 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 625. A memory device may include a single device or a collection of devices across which data and/or instructions are stored. Various embodiments may include a computer-readable medium containing programming instructions that are configured to cause one or more processors to perform the functions described in the context of the previous figures.

An optional display interface 630 may permit information from the bus 600 to be displayed on a display device 635 in visual, graphic or alphanumeric format, such as an in-dashboard display system of the vehicle. The display device may be an in-dash display of a vehicle or a display that is part of a separate electronic device. An audio interface and audio output (such as a speaker) also may be provided. Communication with external devices may occur using various communication devices 640 such as a wireless antenna, a radio frequency identification (RFID) tag and/or short-range or near-field communication transceiver, each of which may optionally communicatively connect with other components of the device via one or more communication system. The communication device(s) 640 may be configured to be communicatively connected to a communications network, such as the Internet, a local area network or a cellular telephone data network.

The hardware may also include a user interface sensor 645 that allows for receipt of data from input devices 650 such as a keyboard or keypad, a joystick, a touchscreen, a touch pad, a remote control, a pointing device and/or microphone. Digital image frames also may be received from a camera 620 that can capture video and/or still images. The system also may receive data from a motion and/or position sensor 670 such as an accelerometer, gyroscope or inertial measurement unit. The system also may include and receive data via a LiDAR system 660, when used in the context of autonomous vehicles.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terms that are relevant to the disclosure above include:

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions. Alternatively, it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other advanced driver assistance systems.

The term "object," when referring to an object that is detected by a vehicle perception system or simulated by a simulation system, is intended to encompass both stationary objects and moving (or potentially moving) actors, except where specifically stated otherwise by use of the term "actor" or "stationary object."

When used in the context of autonomous vehicle motion planning, the term "trajectory" refers to the plan that the vehicle's motion planning system will generate, and which the vehicle's motion control system will follow when controlling the vehicle's motion. A trajectory includes the vehicle's planned position and orientation at multiple points in time over a time horizon, as well as the vehicle's planned steering wheel angle and angle rate over the same time horizon. An autonomous vehicle's motion control system will consume the trajectory and send commands to the vehicle's steering controller, brake controller, throttle controller and/or other motion control subsystem to move the vehicle along a planned path.

In this document, the terms "street," "lane," "road" and "intersection" are illustrated by way of example with vehicles traveling on one or more roads. However, the embodiments are intended to include lanes and intersections in other locations, such as parking areas. In addition, for autonomous vehicles that are designed to be used indoors (such as automated picking devices in warehouses), a street may be a corridor of the warehouse and a lane may be a portion of the corridor. If the autonomous vehicle is a drone or other aircraft, the term "street" or "road" may represent an airway and a lane may be a portion of the airway. If the autonomous vehicle is a watercraft, then the term "street" or "road" may represent a waterway and a lane may be a portion of the waterway.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "computer-readable medium," "data store," "data storage facility" and the like each refer to a non-transitory device on which computer-readable data, programming instructions or both are stored. Except where specifically stated otherwise, the terms "memory," "memory device," "computer-readable medium," "data store," "data storage facility" and the like are intended to include single device embodiments, embodiments in which multiple memory devices together or collectively store a set of data or instructions, as well as individual sectors within such devices. A computer program product is a memory device on which programming instructions are stored.

The terms "processor" and "processing device" refer to a hardware component of an electronic device that is configured to execute programming instructions, such as a microprocessor or other logical circuit. A processor and memory may be elements of a microcontroller, custom configurable integrated circuit, programmable system-on-a-chip, or other electronic device that can be programmed to perform various functions. Except where specifically stated otherwise, the singular term "processor" or "processing device" is intended to include both single-processing device embodiments and embodiments in which multiple processing devices together or collectively perform a process.

The term "classifier" means an automated process by which an artificial intelligence system may assign a label or category to one or more data points. A classifier includes an algorithm that is trained via an automated process such as machine learning. A classifier typically starts with a set of labeled or unlabeled training data and applies one or more algorithms to detect one or more features and/or patterns within data that correspond to various labels or classes. The algorithms may include, without limitation, those as simple as decision trees, as complex as Naïve Bayes classification, and/or intermediate algorithms such as k-nearest neighbor. Classifiers may include artificial neural networks (ANNs), support vector machine classifiers, and/or any of a host of different types of classifiers. Once trained, the classifier may then classify new data points using the knowledge base that it learned during training. The process of training a classifier can evolve over time, as classifiers may be periodically trained on updated data, and they may learn from being provided information about data that they may have misclassified. A classifier will be implemented by a processor executing programming instructions, and it may operate on large data sets such as image data, LIDAR system data, and/or other data.

In this document, when relative terms of order such as "first" and "second" are used to modify a noun, such use is simply intended to distinguish one item from another, and is not intended to require a sequential order unless specifically stated.

The invention claimed is:

1. A method of generating a vector map of a geographic area, the method comprising, by a processor:
acquiring a birds-eye view image of the geographic area, wherein the birds-eye view image comprises a plurality of pixels;
processing the birds-eye view image to generate a spatial graph representation of the geographic area by:
classifying each pixel of the birds-eye view image as either a lane pixel or a non-lane pixel, processing the lane pixels to extract a plurality of features of the geographic area that are to be represented in the vector map, for each of the lane pixels, determining a likelihood value that the lane pixel contains a feature of the geographic area that is to be represented in the vector map, classifying the lane pixels having likelihood values that exceed a threshold as node pixels, and generating the vector map by generating a plurality of lines such that each of the lines connects a corresponding pair of the node pixels, wherein each of the lines represents a lane segment in the geographic area, wherein generating the lines that connect the pairs of the node pixels comprises:

identifying, as the pairs of the node pixels, any pair of adjacent node pixels having features that indicate a relationship of spatial similarity; and generating a matrix in which each element of the matrix has a value that indicates whether the pair of adjacent node pixels that the element represents are connected;

saving the vector map comprising nodes representing the node pixels and the lines to a vector map data set; and moving an autonomous vehicle along a trajectory generated using the vector map data set.

2. The method of claim 1, wherein the plurality of features of the geographic area comprise a lane border.

3. The method of claim 1, further comprising: before generating the lines that connect the pairs of the node pixels, transforming each of the node pixels into a one-dimensional token.

4. The method of claim 3, wherein each one-dimensional token is a vector representing one or more characteristics that are present at the geographic area at a spatial location that corresponds to the node pixel.

5. The method of claim 1, wherein processing the lane pixels to extract the plurality of features of the geographic area is performed by employing a neural network.

6. A system for generating a vector map of a geographic area, the system comprising:

a processor: and a memory device containing programming instructions that are configured to cause the processor to:

receive a birds-eye view image of the geographic area, wherein the birds-eye view image comprises a plurality of pixels;

process the birds-eye view image to generate a spatial graph representation of the geographic area by:

classifying each pixel of the birds-eye view image as either a lane pixel or a non-lane pixel, processing the lane pixels to extract a plurality of features of the geographic area that are to be represented in the vector map, for each of the lane pixels, determining a likelihood value that the lane pixel contains a feature of the geographic area that is to be represented in the vector map, classifying the lane pixels having likelihood values that exceed a threshold as node pixels, and generating the vector map by generating a plurality of lines such that each of the lines connects a corresponding pair of the node pixels, wherein each of the lines represents a lane segment in the geographic area, wherein generating the lines that connect the pairs of the node pixels comprises:

identifying, as the pairs of the node pixels, any pair of adjacent node pixels having features that indicate a relationship of spatial similarity; and generating a matrix in which each element of the matrix has a value that indicates whether the pair of adjacent node pixels that the element represents are connected;

save the vector map comprising nodes representing the node pixels and the lines to a vector map data set; and move a vehicle along a trajectory generated using the vector map data set.

7. The system of claim 6, wherein the plurality of features of the geographic area comprise a lane border.

8. The system of claim 6, wherein the memory device further contains additional programming instructions that are configured to cause the processor to, before generating the lines that connect the pairs of the node pixels, transform each of the node pixels into a one-dimensional token.

9. The system of claim 8, wherein each one-dimensional token is a vector representing one or more characteristics that are present at the geographic area at a spatial location that corresponds to the node pixel.

10. The system of claim 6, wherein processing the lane pixels to extract the plurality of features of the geographic area is performed by employing a neural network.

11. A computer program product for generating a vector map of a geographic area, the computer program product comprising a memory device containing programming instructions that are configured to cause a processor to:

receive a birds-eye view image of the geographic area, wherein the birds-eye view image comprises a plurality of pixels;

process the birds-eye view image to generate a spatial graph representation of the geographic area by:

classifying each pixel of the birds-eye view image as either a lane pixel or a non-lane pixel, processing the lane pixels to extract a plurality of features of the geographic area that are to be represented in the vector map, for each of the lane pixels, determining a likelihood value that the lane pixel contains a feature of the geographic area that is to be represented in the vector map, classifying the lane pixels having likelihood values that exceed a threshold as node pixels, and generating the vector map by generating a plurality of lines such that each of the lines connects a corresponding pair of the node pixels, wherein each of the lines represents a lane segment in the geographic area, wherein generating the lines that connect the pairs of the node pixels comprises:

identifying, as the pairs of the node pixels, any pair of adjacent node pixels having features that indicate a relationship of spatial similarity; and generating a matrix in which each element of the matrix has a value that indicates whether the pair of adjacent node pixels that the element represents are connected;

save the vector map comprising nodes representing the node pixels and the lines to a vector map data set; and move a vehicle along a trajectory generated using the vector map data set.

12. The computer program product of claim 11, wherein the memory device further contains additional programming instructions that are configured to cause the processor to, before generating the lines that connect the pairs of the node pixels, transform each of the node pixels into a one-dimensional token, wherein each one-dimensional token is a vector representing one or more characteristics that are present at the geographic area at a spatial location that corresponds to the node pixel.

* * * * *